(12) United States Patent
McAfee

(10) Patent No.: US 7,237,333 B2
(45) Date of Patent: Jul. 3, 2007

(54) SURFACE MOUNT CAPTIVE SCREW FERRULE FOR PCB

(75) Inventor: Eric D. McAfee, DuPont, WA (US)

(73) Assignee: Intel Corporation, Santa Clara, CA (US)

( * ) Notice: Subject to any disclaimer, the term of this patent is extended or adjusted under 35 U.S.C. 154(b) by 91 days.

(21) Appl. No.: 11/043,390

(22) Filed: Jan. 25, 2005

(65) Prior Publication Data

US 2005/0129483 A1 Jun. 16, 2005

Related U.S. Application Data

(63) Continuation of application No. 10/017,613, filed on Dec. 13, 2001, now Pat. No. 7,083,371.

(51) Int. Cl.
*H05K 3/00* (2006.01)
(52) U.S. Cl. .................. 29/843; 29/840; 228/248.1
(58) Field of Classification Search ............. 411/352, 411/353, 107, 999, 171; 29/453, 436, 843, 29/840; 228/135, 139, 140, 246, 248.1
See application file for complete search history.

(56) References Cited

U.S. PATENT DOCUMENTS

| 2,583,868 | A | | 1/1952 | Mociun |
| 2,784,758 | A | | 3/1957 | Rohe |
| 3,020,987 | A | * | 2/1962 | Schaurte ..................... 403/179 |
| 3,346,032 | A | | 10/1967 | Gulistan |
| 4,572,718 | A | | 2/1986 | Stevens et al. |
| 5,382,124 | A | | 1/1995 | Frattarola |
| 5,743,692 | A | | 4/1998 | Schwarz |
| 5,785,449 | A | | 7/1998 | DiBene |
| 6,079,923 | A | | 6/2000 | Ross et al. |
| 6,786,691 | B2 | * | 9/2004 | Alden, III ................ 411/371.2 |
| 6,814,530 | B2 | | 11/2004 | Franco et al. |

* cited by examiner

*Primary Examiner*—Flemming Saether
(74) *Attorney, Agent, or Firm*—Blakely, Sokoloff, Taylor & Zafman LLP

(57) ABSTRACT

A method and apparatus for holding a screw captive to a printed circuit board (PCB), with a channel formed through the apparatus and a mounting hole formed through the PCB being in alignment to allow a screw to pass therethrough.

5 Claims, 2 Drawing Sheets

SURFACE MOUNT CAPTIVE SCREW FERRULE FOR PCB

The present application is a continuation of U.S. patent application Ser. No. 10/017,613, filed Dec. 13, 2001 now U.S. Pat. No. 7,083,371.

FIELD OF THE INVENTION

The present invention is related to hardware used to mount other hardware in fixed relation to a printed circuit board (PCB).

ART BACKGROUND

The vast majority of current day computer systems make use of one or more printed circuit boards (PCBs) mounted within a computer system's chassis by way of screws protruding through holes formed in those PCBs. However, with such use of screws comes the attendant disadvantage and inconvenience of the screws being loose components.

An increasingly commonplace solution is captive screws, i.e., screws that are held captive to the PCB with which they are associated by way of a captivating component often referred to as a ferrule, or in some cases, referred to as a retainer. A ferrule, or retainer, retains itself to the PCB, and in turn, retains a screw to the PCB by retaining the screw to itself. Various forms of ferrules exist, but with various drawbacks including risk of damage to the PCB and/or requirements for a hole that is much larger than would actually be required for the screw to be used, alone. A further drawback is that many of the current types of ferrule protrude through the PCB, and this protrusion can be difficult to accommodate in various chassis designs. Yet another disadvantage is that at the time the PCB is assembled, the ferrule typically requires a separate step to be installed, thereby adding to the time and/or cost required when installing components on a PCB (also commonly referred to as 'populating' a PCB).

BRIEF DESCRIPTION OF THE DRAWINGS

The objects, features, and advantages of the present invention will be apparent to one skilled in the art in view of the following detailed description in which.

DETAILED DESCRIPTION

In the following description, for purposes of explanation, numerous details are set forth in order to provide a thorough understanding of the present invention. However, it will be apparent to one skilled in the art that these specific details are not required in order to practice the present invention.

The present invention concerns mounting hardware to mount other hardware into a fixed relationship with a PCB. Specifically, the present invention concerns using a ferrule (or retainer) mounted to the surface of a PCB by way of commonly used surface mount soldering techniques for PCBs. This ferrule is used to hold a screw captive to the PCB for use in mounting the PCB.

Figure 1:
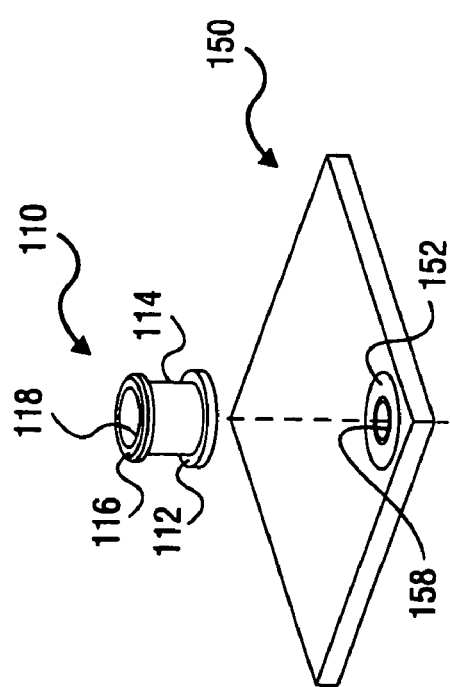
FIG. 1 is a perspective view of one embodiment of the present invention.

FIG. 1 is a perspective view of one embodiment of the present invention. The body of ferrule 110 is comprised of solder flange 112, tube 114 and capture flange 116. Formed through all three of solder flange 112, tube 114 and capture flange 116 is screw channel 118 through which a screw to be held captive would protrude. On the depicted surface of PCB 150 is solder ring 152 centered about the periphery of mounting hole 158.

Ferrule 110 is shown positioned over PCB 150 such that screw channel 118 formed through the body of ferrule 110 is aligned with mounting hole 158 of PCB 150. Solder flange 112 provides a soldering extension that comes into contact with solder ring 152 to fixedly attach ferrule 110 to PCB 150 through any of a number of widely known surface mount circuit board assembly or populating techniques. When ferrule 110 is fixedly attached to PCB 150, capture flange 116 provides a capture extension that may be used to hold a screw captive to PCB 150 such that the captive screw (not shown) protrudes at least through screw channel 118 when PCB 150 is not mounted, and such that the captive screw protrudes through both screw channel 118 and mounting hole 158 when PCB 150 is mounted.

Figure 2:
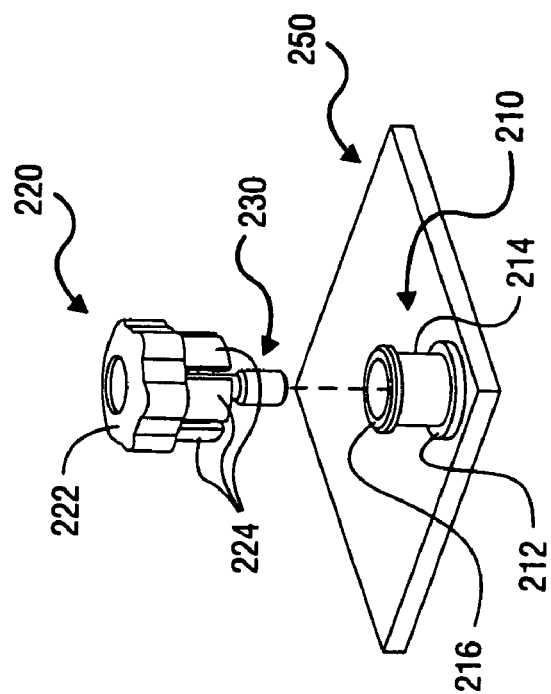
FIG. 2 is a perspective view of another embodiment of the present invention.

FIG. 2 is a perspective view of another embodiment of the present invention. In a manner generally corresponding to ferrule 110 of FIG. 1, the body of ferrule 210 is comprised of solder flange 212, tube 214 and capture flange 216, with screw channel 218 formed through all three of solder flange 212, tube 214 and capture flange 216.

Ferrule 210 is shown installed on the surface of PCB 250, ferrule 210 having been attached to PCB 250 through any of a number of widely known surface mount circuit board assembly or populating techniques. Though not visible in FIG. 2, this use of a widely known surface mount circuit board assembly or populating technique has resulted in solder flange 212 being soldered to a solder ring on the surface of PCB 250, underneath ferrule 210. Also not visible in FIG. 2 is that ferrule 210 has been installed at a location on PCB 250 such that screw channel 218 is aligned with a mounting hole formed through PCB 250 (and underneath ferrule 210) to form an continuous opening through both ferrule 210 and PCB 250.

Captive screw 230, installed within overmold 220, is shown positioned over ferrule 210 such that captive screw 230 is aligned with screw channel 218 of ferrule 210 installed on PCB 250. Overmold 220 is comprised of head 222 and extensions 224. When captive screw 230 is installed at least through screw channel 218, extensions 224 of overmold 220 engage capture flange 216 of ferrule 210 to hold captive screw 230 captive to PCB 250.

Although overmold 220 is depicted as having a distinct head 222 and extensions 224 that engage capture flange 216 of ferrule 210, the exact shape or configuration of overmold 220 can be changed without departing from the spirit and scope of the invention as hereinafter claimed.

Figure 3B:
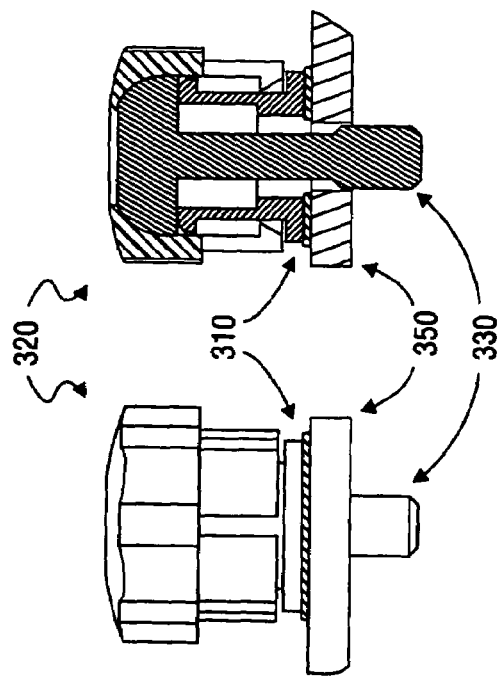
FIGS. 3a and 3b are both combined side and sectional views of still another embodiment of the present invention.
Figure 3A:
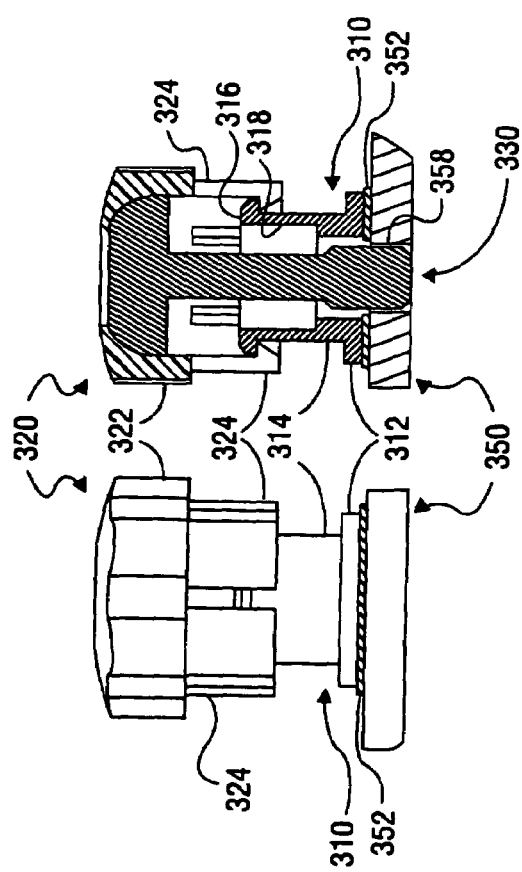

FIGS. 3a and 3b are both combined side and sectional views of still another embodiment of the present invention. In a manner generally corresponding to ferrule 210 of FIG. 2, the body of ferrule 310 of FIGS. 3a and 3b is comprised of solder flange 312, tube 314 and capture flange 316, with screw channel 318 formed through all three of solder flange 312, tube 314 and capture flange 316.

In both FIGS. 3a and 3b, Ferrule 310 is shown installed on the surface of PCB 350, ferrule 310 having been attached to PCB 350 through any of a number of widely known surface mount circuit board assembly or populating techniques, resulting in solder flange 312 being soldered to solder ring 352 on the surface of PCB 350, underneath ferrule 310. As shown, ferrule 310 has been installed at a location on PCB 350 such that screw channel 318 is aligned with mounting hole 358 formed through PCB 350 to form a continuous opening through both ferrule 310 and PCB 350.

In both FIGS. 3a and 3b, captive screw 330, installed within overmold 320, is shown positioned so as to extend through screw channel 318 of ferrule 310. Overmold 320 is comprised of head 322 and extensions 324. With captive screw 330 installed, as shown, so as to protrude through at least screw channel 318, extensions 324 of overmold 320 engage capture flange 316 of ferrule 310 to hold captive screw 330 captive to PCB 350. In FIG. 3a, captive screw 330 is positioned such that it does not protrude beyond the side of PCB 350 opposite ferrule 310, which is a position that captive screw 330 might have prior to PCB 350 being mounted using captive screw 330. In this position, extensions 324 of overmold 320 limit the extent to which captive screw 330 may be pulled away from PCB 350 by engaging capture flange 316 of ferrule 310.

However, in FIG. 3b, captive screw 330 is positioned such that it does protrude beyond the side of PCB 350 opposite ferrule 310, which is the position that captive screw 330 would have when PCB 350 is mounted using captive screw 330. In this position, the threads of captive screw 330 engage whatever hardware is on the side of PCB 350 opposite ferrule 310, and in so doing, the head of captive screw 330 presses ferrule 310 against PCB 350, thereby pressing PCB 350 against whatever hardware is on the side of PCB opposite ferrule 310, and PCB 350 is thereby mounted.

As depicted in FIGS. 3a and 3b, screw channel 318 formed through ferrule 310 changes diameter part of the way through ferrule 310. This change in diameter is made so as to create a ledge about the periphery of where the diameter is reduced, providing a surface against which a spring (not shown) could be installed at least partly within ferrule 310, surrounding the portion of captive screw 330 that protrudes through screw channel 318, and pressing either against the underside of the portion of captive screw 330 installed within head 322 of overmold 320 or against head 322 of overmold 320, itself. Alternatively, screw channel 318 could be formed through ferrule 310 with a single and unchanging diameter, and such a spring could be installed against the surface of PCB 350 that faces ferrule 310. Either way, the installation of such spring could be used to bias captive screw 330 into the position depicted in FIG. 3a when captive screw 330, making this position into a predetermined position for captive screw 330 when captive screw 330 is not otherwise being used to mount PCB 350. As an alternative to or in addition to the use of a spring, extensions 324 of overmold 320 could be configured to press against the outer surface of tube 314 of ferrule 310, thereby causing friction between extension 324 and ferrule 310 that could be used to selectively hold captive screw 330 in either of the positions depicted in FIGS. 3a and 3b, or any of a number of positions in between.

Although solder ring 352 is depicted as being only a ring of solder on the surface of PCB 350 facing ferrule 310, those skilled in the art will recognize that mounting hole 358 formed through PCB 350 could be plated through with solder with a second solder ring (not shown) on the opposite surface of PCB 350 (i.e., the surface of PCB 350 facing away from ferrule 310). Plating through mounting hole 358 and having such a second solder ring on the opposite surface of PCB 350 may be done to assist in ensuring a desired electrical connection between a conductor of PCB 350 and the surface to which PCB 350 is mounted using captive screw 330.

Although captive screw 330 is depicted as having a substantially flat head, those skilled in the art will recognize that the exact shape or configuration of captive screw 330 can be changed without departing from the spirit and scope of the invention as hereinafter claimed. Also, although overmold 320 is depicted as having a distinct head 322 and extensions 324 that engage capture flange 316 of ferrule 310, the exact shape or configuration of overmold 320 can be changed without departing from the spirit and scope of the invention as hereinafter claimed. Furthermore, although captive screw 330 and overmold 320 are depicted a separate pieces with captive screw 330 installed within overmold 320, those skilled in the art will appreciate that other combinations of parts could be used to create the equivalent of the combination of captive screw 330 and overmold 320 without departing from the spirit and scope of the invention as hereinafter claimed. Indeed, captive screw 330 and overmold 320 may also be fabricated as a single piece.

Although ferrules 110, 210 and 310 have all been depicted as having a capture flange 116, 216 and 316, respectively, that is meant to be engaged as part of holding a screw captive, those skilled in the art will recognize that one or more of ferrules 110, 210 or 310 may hold a screw captive using a different shape or configuration that would have a different form of capture extension other than capture flange 116, 216 or 316. Also, although ferrules 110, 210 and 310 have all been depicted as having a solder flange 112, 212 and 312, respectively, that is meant to provide the surface to be used in surface mounting ferrules 110, 210 and 310 to a PCB, those skilled in the art will recognize that one or more of ferrules 110, 210 or 310 may have a different form of soldering extension using a different shape or configuration that would provide sufficient soldering surface area to enable surface mounting to a PCB.

The invention has been described in conjunction with the preferred embodiment. It is evident that numerous alternatives, modifications, variations and uses will be apparent to those skilled in the art in light of the foregoing description. Although the invention has been discussed repeatedly as being used in conjunction with a substantially cylindrical and tubular ferrule (or retainer), it will be understood by those skilled in the art that the present invention may be practiced in conjunction with ferrules of other shapes and configurations. Furthermore, although the example embodiments of the present invention are described in the context of holding a screw captive to a PCB, the present invention may be practice in conjunction with holding other types of fasteners or other hardware captive to a PCB.

What is claimed is:

1. A method comprising:
   soldering a ferrule, the ferrule having a body with a channel formed therethrough from a first end of the body having a capture extension to a second end of the body having a soldering extension in the form of a solder flange providing a soldering surface, wherein the soldering surface is the lowest surface on the ferrule, to a first surface of a material of a printed circuit board by the solder flange of the ferrule at a location on the first surface where the channel formed through the ferrule aligns with a mounting hole formed through the first surface and of the material of the printed circuit board, itself;
   inserting a screw through the channel formed through the ferrule; and
   using the capture extension to hold the screw captive to the ferrule.

2. The method of claim 1, wherein soldering the ferrule comprises using a surface mount populating technique to solder the soldering extension to the material of the printed circuit board, itself.

3. The method of claim 1, further comprising using the screw protruding through both the channel formed through the ferrule and the mounting hole formed through the material of the printed circuit board, itself, to mount the printed circuit board.

4. The method of claim 3, further comprising positioning a spring within the channel formed through the ferrule to bias the screw into a predetermined position when the screw is not being used to mount the printed circuit board.

5. The method of claim 1, wherein the screw is comprised of a head installed within an overmold having at least one extension that engages the capture extension, and that cooperates with the capture extension to hold the screw captive to the ferrule.

* * * * *